US007010275B2

(12) United States Patent
Davies

(10) Patent No.: US 7,010,275 B2
(45) Date of Patent: Mar. 7, 2006

(54) RADIO SYSTEM WITH CORDLESS REMOTE PTT MODULE

(75) Inventor: John Davies, York (GB)

(73) Assignee: Davies Industrial Communications Limited, Wigginton (GB)

(*) Notice: Subject to any disclaimer, the term of this patent is extended or adjusted under 35 U.S.C. 154(b) by 315 days.

(21) Appl. No.: 10/168,352

(22) PCT Filed: Dec. 15, 2000

(86) PCT No.: PCT/GB00/04836

§ 371 (c)(1),
(2), (4) Date: Oct. 28, 2002

(87) PCT Pub. No.: WO01/45281

PCT Pub. Date: Jun. 21, 2001

(65) Prior Publication Data
US 2003/0092399 A1 May 15, 2003

(30) Foreign Application Priority Data
Dec. 16, 1999 (GB) .................................. 9929634

(51) Int. Cl.
*H04B 1/38* (2006.01)

(52) U.S. Cl. .................................... 455/90.2; 455/66.1

(58) Field of Classification Search ............... 455/90.2, 455/90.3, 66.1, 74, 569.1, 569.2, 575.1, 575.6, 455/41.1, 41.2
See application file for complete search history.

(56) References Cited

U.S. PATENT DOCUMENTS

| 5,790,947 A | 8/1998 | Dieringer |
| 5,884,198 A | 3/1999 | Kese et al. |
| 5,940,007 A * | 8/1999 | Brinkmeyer et al. ... 340/825.69 |
| 6,311,052 B1 * | 10/2001 | Lenz .......................... 455/305 |
| 2003/0114134 A1 * | 6/2003 | Davies ........................ 455/345 |

FOREIGN PATENT DOCUMENTS

| FR | 2 693 962 | 1/1994 |
| GB | 2 287 231 A | 9/1995 |
| WO | WO 99/45500 | 9/1999 |

* cited by examiner

*Primary Examiner*—Lee Nguyen
(74) *Attorney, Agent, or Firm*—Martin Fleit; Paul D. Bianco; Fleit Kain Gibbons Gutman Bongini & Bianco P.L.

(57) ABSTRACT

A radio system comprises a radio having a transmit mode. A press to talk (PTT) switch is located in a remote module having a transmitter that transmits a signal to a receiver associated with the radio. In response, the receiver opens a communication channel to the radio. The remote module enables the PTT switch to be located at a convenient location to the operator.

17 Claims, 5 Drawing Sheets

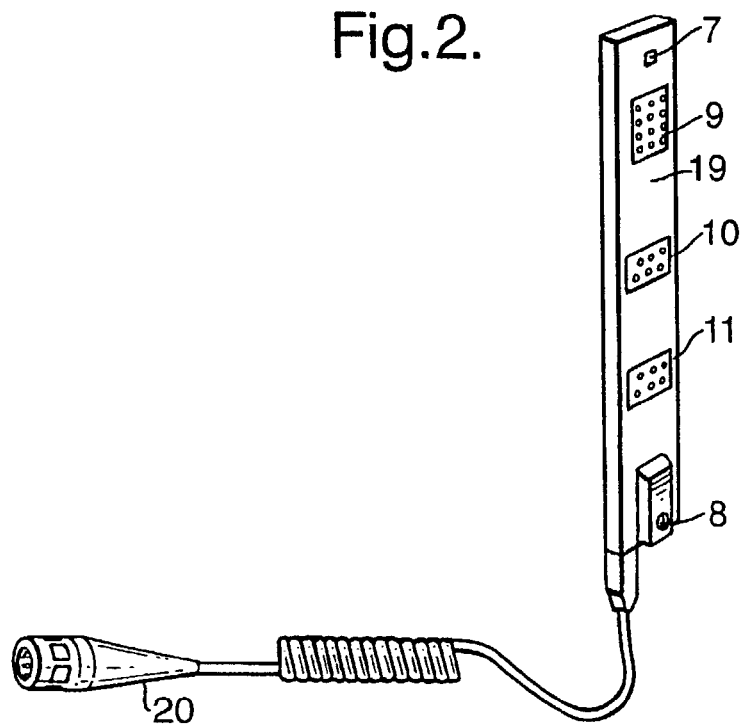
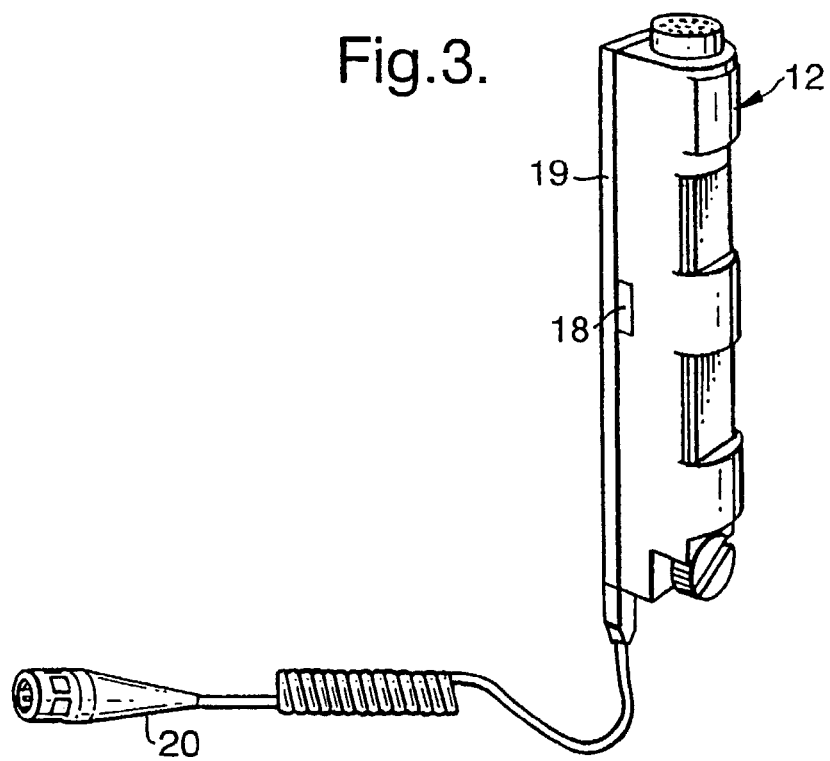

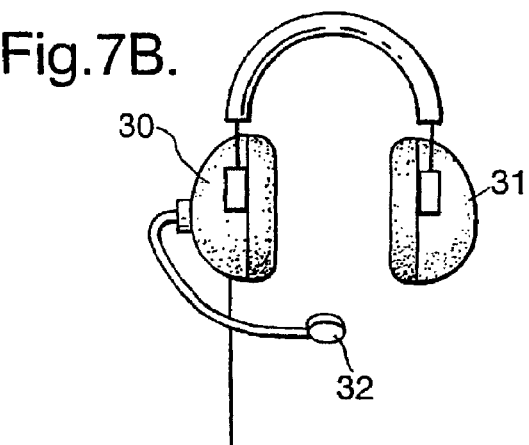
Fig.7B.
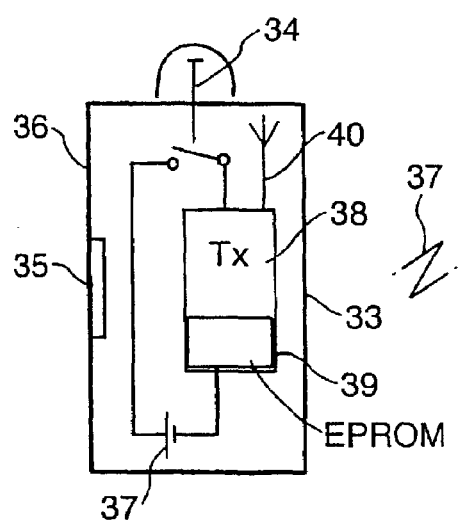
Fig.7A.
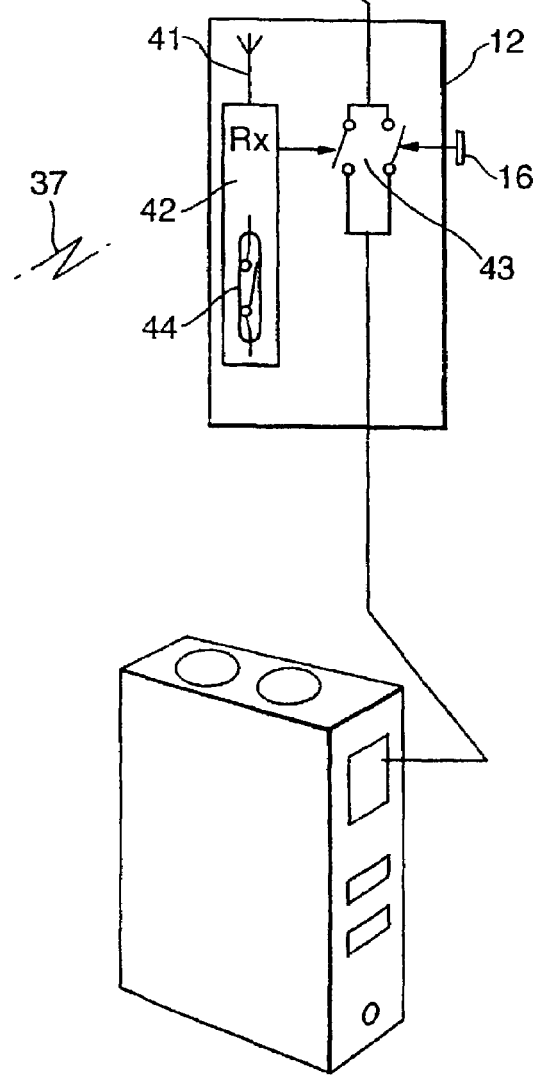

RADIO SYSTEM WITH CORDLESS REMOTE PTT MODULE

The present invention relates to a radio system and particularly, but not exclusively, to a system employing what are commonly known as personal role radios as typically carried by members of the armed forces or organisations such as the Police. Here there is often a requirement for an individual to have a personal role radio to permit two way communication.

Conventional two way radios operate in either duplex or simplex mode, the duplex mode is similar to a telephone system where the receive and transmit paths are both open and both parties can speak to each other with no other requirement.

The more common operation is simplex where the transmit path of each radio only works when the transmitter is keyed by the operation of a "press to talk switch" (PTT). The types of switch used vary and can be either part of a microphone as in the case of the hand held types in common use, or a switch box in a lead between the radio and a headset, as used in commercial and operational headsets.

Operators often have to operate a radio transmit switch while using their hands to do other things and certain systems incorporate voice activation where the radio is switched at the detection of the users voice from the microphone. This technique is not reliable with some applications and the need for a switch actuated by the user is till the only reliable means of controlling the radio.

According to the present invention there is provided a radio system comprising a radio having a transmit mode, the system further comprising a cordless remote module in which a press to talk (PTT) switch is housed and used to set the radio to the transmit mode, the remote module comprising a short range, relative to the radio, transmitter, the system further comprising a receiver associated with the radio for receiving signals from the remote module to set the radio to a transmit mode.

Employing the present invention enables an operative to locate a remote module at a convenient location, for example the stock of a rifle, steering wheel of a car, handlebars of a motorbike or at the controls of a fast boat, while locating the radio elsewhere. Thus the operative may push the PTT switch and reply to any received communication without needing to move away from the controls or duly distract himself from his current activity.

The short range transmitter is advantageously a radio transmitter but could be an infra-red transmitter, which may be acceptable in certain applications.

Where an operative needs to communicate via two radio networks, as may occur in a military application where the operative needs to communicate locally via a personal role radio but may also wish to have access to a combat network radio, it is desirable that the remote module comprises two PTT switches respectively associated with different radio networks. It is particularly advantageous that a signal transmitted from the remote module comprises a code and that the receiver is responsive to the code, thereby avoiding unintended operation of transmitters in the vicinity of the remote module which may not be associated with the remote module.

It may be desirable that the receiver is responsive to a variety of codes associated with different remote modules In this manner an operative may have a plurality of remote modules associated with different items of equipment, for example a motorbike, a rifle or a motor car. Each may have a remote unit semi-permanently installed on those pieces of equipment.

A very significant problem associated with having a code associated with a remote module and a receiver that only accepts a signal with that code arises if that remote module, which may be small and easily misplaced, is lost or damaged. However this problem can be overcome by employing a receiver which has a "learn" mode in which it can learn the code of a remote module. This is possible because, unlike other remotely operated key fobs on motorcars or the like, there is no security aspect involved. Therefore it is permissable for the radio, or the receiver associated with the radio, to learn the code of the remote module. This is also particularly advantageous in applications where remote modules are permanently fitted to items of equipment such as a motor vehicle or motorbike. Taking a Police motorbike again as an example, if this is fitted with a remote module any Police rider can ride that motorbike and use their own personal radio, requiring only that when mounting the bike for the first time they programme their receiver with the code of the remote module on that bike.

The system advantageously employs a receiver which has associated with it a magnetically operated switch and a remote module comprising a magnet, the magnet and magnetically operated switch being arranged such that the magnetically operated switch is caused to adopt a learn mode position when the remote module including said magnet is held in an appropriate position relative to the magnetically sensitive switch, in which position activation of the PTT switch on the remote module causes the receiver to learn the code in the remote module. Although this function could equally be achieved by pushing a screwdriver possibly in a small reset hole the magnet arrangement is particularly advantageous as it needs no other tools, only the remote module, to set the code.

Advantageously depressing the PTT switch on the remote module a number of times, or for a period in excess of a pre-determined period, causes any codes within the receiver to be removed from the receiver so that the receiver is no longer responsive to those codes. In this manner a receiver can be responsive to multiple codes, for example permitting a number of Police riders to ride common motorbikes. However when two riders who commonly share two bikes are out on patrol together they can reset the receivers associated with their respective radios to ensure that operation of the remote module on one particular motorbike only operates the correct radio associated with the person riding the bike and not the radio of his colleague.

The receiver for the signal from the remote module may be located in the radio itself but alternatively the receiver may be located separate from the radio but wired to the radio.

Preferably the radio has an additional PTT switch in electrical contact with the radio, the additional switch being arranged to function parallel with the PTT switch of the remote module. This may provide a convenient backup should the remote module fail or be misplaced. It may also have particular advantages in certain applications. Referring again to the Police motorbike application, this will enable the rider to leave the motorbike with his personal role radio with a PTT switch on his person associated with that personal role radio so that the radio can be operated while he his away from the remote module located on the bike.

The additional PTT switch may be located in a unit separable from the radio with the receiver signals from the remote module also being in that separable unit. In this manner the radio may be remote from the separable unit. This may be advantageous where an operative may wish to leave a personal role radio, for example in a fixed location on a vehicle, but have it wired to an interface connected to the separable unit with the PTT switch. The separable unit may then be mounted adjacent to the operatives normal seating position within a vehicle. In this manner the operative may use the PTT switch on the separable unit which may also have a connection for his headphones. In addition a further, smaller remote module may be mounted directly on the controls used to operate the vehicle so that an operative doesn't need to remove his hands from those controls.

One embodiment of the present invention will now be described by way of example only with reference to the accompanying figures of which:

FIG. 2 is a perspective view of a remote radio interface;

FIG. 3 shows the assembled apparatus of FIGS. 1B and 2;

Figure 1A:
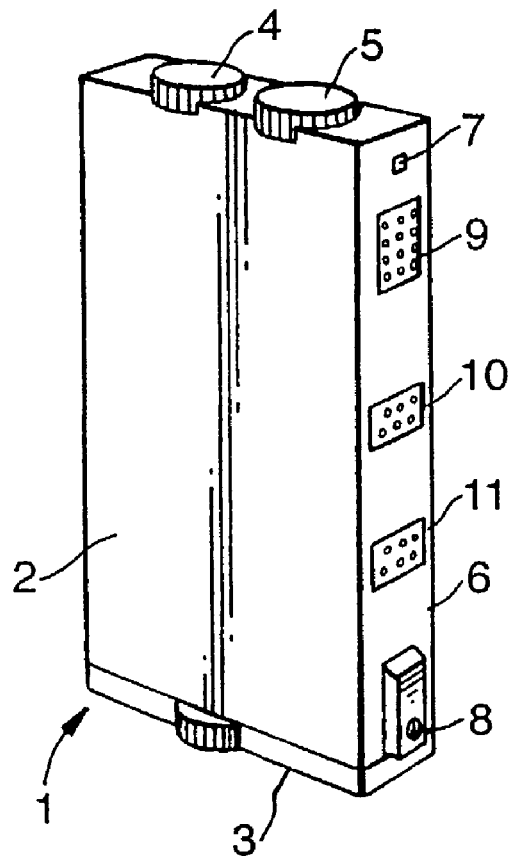
FIG. 1A is a perspective view of a personal role radio in accordance with the present invention.
Figure 1B:
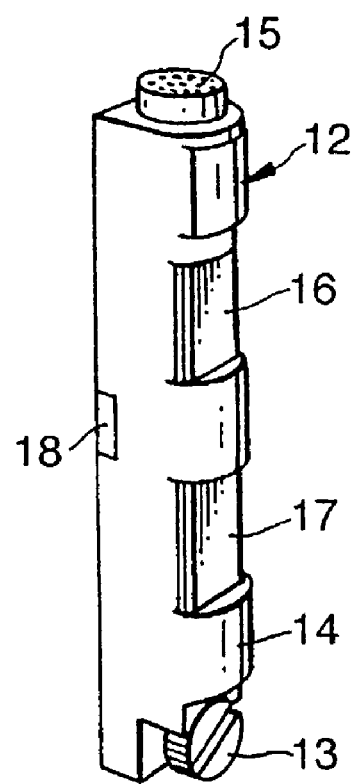
FIG. 1B is a perspective view of a universal communication interface (UCI) in accordance with the present invention.
Figure 6:
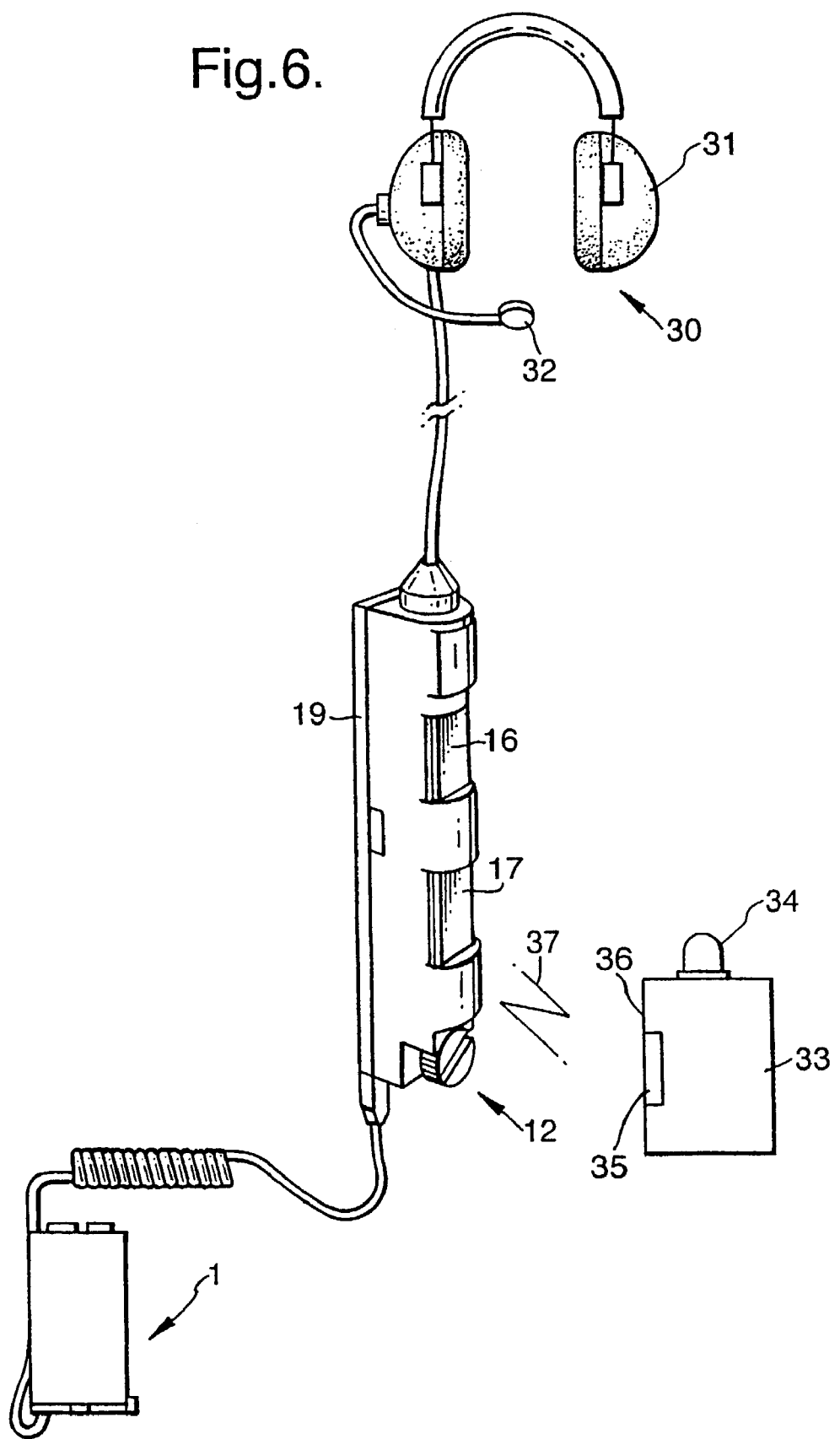
FIG. 6 illustrates the various communications equipment that interfaces with the universal communication interface of FIG. 1B.

FIG. 7A schematically illustrates the primary components within the remote module illustrating FIG. 6; and FIG. 7B illustrates the primary components of the UCI of FIG. 1B and FIG. 6 which relate to remote operation of the UCI by means of the remote module of FIG. 7A.

Referring now to FIG. 1, a personal role radio is illustrated generally as 1, having a casing 2, a battery compartment cover 3, operating controls 4 and 5, and an end face constituting a radio interface 6. The interface 6, has a fitting slot 7, fitting thread 8 and electrical interconnects 9, 10 and 11.

The personal role radio 1 comprises an aerial, (which is internal on the embodiment illustrated), a transmitter and receiver by which it may send and receive radio signals. The personal role radio is designed to be carried by an operative and would typically be carried on a belt or could be mounted in close proximity to the operative, for example on a vehicle associated with the operative.

The radio interface 6 is designed to receive the universal communication interface (UCI) indicated generally as 12 in FIG. 1B. The UCI 12 comprises a stud not shown and screw 13 which co-operate respectively with fitting slot 7 and fitting thread 8 to hold the UCI housing 14 in position. The UCI 12 comprises a headset connector 15, push to talk (PTT) buttons 16 and 17 respectively associated with two different radio networks and two slots, only one 18 of which is shown, for receiving optional cable connections.

The switches 16 and 17 are depressed in order to talk to respective communication networks through respective radios, one button 16 is associated with the personal role radio 1 of FIG. 1A, while button 17 is associated with a external radio network, which may be a combat network radio where the radio system is employed in a military application.

The universal communication interface comprises circuitry to ensure that when a signal is being received on one communication network the press to talk function controlled by the button associated with the other network cannot be activated. This ensures that a radio signal being received and transmitted to a user, possibly by means of a headset, cannot inadvertently be picked up by the open microphone and simultaneously transmitted on the other radio network.

When the radio of FIG. 1A is mounted to the UCI of FIG. 1B and an appropriate headset or speaker/microphone are connected to the UCI there is a self-contained personal role radio which may be carried by an operative, the radio interfacing with the universal communication interface via contacts 9 and corresponding contacts (not shown) on the universal communication interface 12.

There are applications where it is not convenient for the operative to carry the personal role radio, or where the operative may wish to use another radio, perhaps mounted in a vehicle. Indeed the operative may wish to mount his personal role radio within a vehicle. This is facilitated by the remote radio interface 19 of FIG. 2 which is identical to the interface 6 on the personal role radio on FIG. 1A, but instead of being part of that personal role radio is now a stand alone interface which may be connected to another radio which could be mounted on board a vehicle, aircraft, boat etc, or a large Man-pack infantry radio, by means of connection lead 20.

The remote radio interface 19 comprises the same physical and electrical connections as the interface 6 and thus the UCI can be mounted to the remote radio interface 19 as shown in FIG. 3. Referring now to both FIG. 1B and FIG. 3, slot 18 in the UCI 12 may receive a cable with contacts on a spade which connect to contacts 10. A corresponding slot (not shown) on the other side of the UCI permits a similar cable with contacts to connect with the contacts 11 on the interface 6 or 19. These additional leads are illustrated in FIG. 4, lead 21 being connected and lead 22 shown disconnected in order to illustrate contact spade 23 which connects to contacts 11 of FIGS. 1A and 2.

Figure 4:
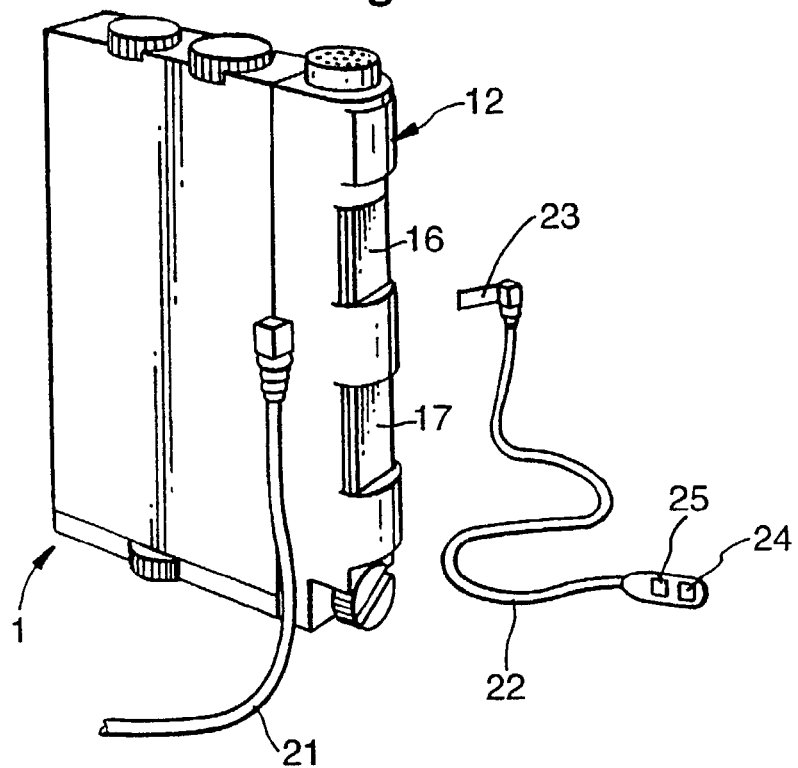
FIG. 4 shows the assembled apparatus of FIG. 1A and FIG. 1B with auxiliary components.

In the arrangement shown in FIG. 4, the UCI 12 is mounted on the personal role radio 1 but could equally be connect to the remote radio interface 19 of FIG. 2, as shown in FIG. 3. Lead 21 may be connected to an auxiliary radio depending on the application, whilst leads 22 connects remote switches 24 and 25, corresponding to press to talk switches 16 and 17 to the UCI 12. The additional switches 24 and 25 may be located at a position convenient to an operative for example, on the handlebars of a motorcycle or quad bike or on the stock of a rifle. This permits the radio to be operated without the operative needing to remove his hands from the controls of the vehicle or from a gun he his carrying Alternatively, depending on the application, this function may be satisfied simply by having the UCI 12 mounted on the remote radio interface 19 as shown in FIG. 3 and having the complete unit then mounted at an appropriate location, either on a vehicle or perhaps on a chest holster worn by an operative. It will be realised that there are any number of permutations which a remote universal communication interface 12 permits.

Figure 5:
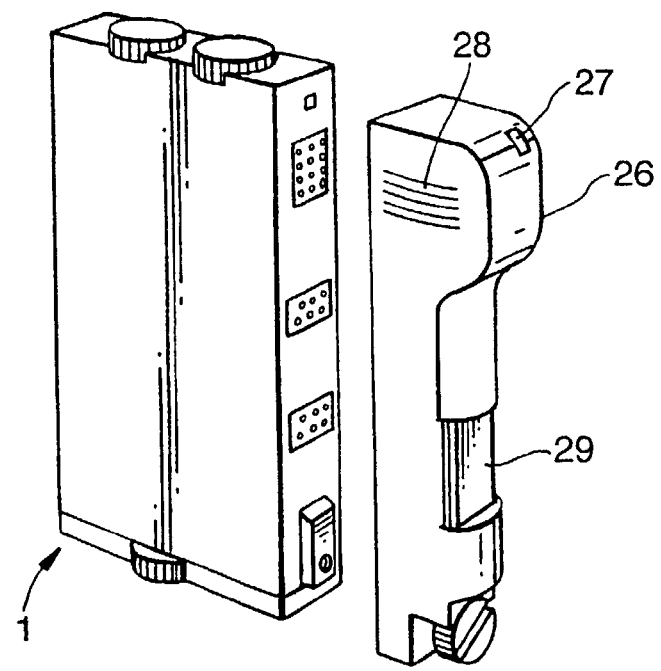
FIG. 5 illustrates an alternative universal communication interface with self-contained speaker and microphone.

Referring now to FIG. 5, there is illustrated a variation of the universal communication interface of FIG. 1B. Here UCI 26 incorporates a microphone 27 and speaker 28 such that it can be operated without a headset. In the embodiment illustrated there is only a single push to talk switch 29 but this is a matter of design choice. The UCI 26 interfaces with the personal role radio 1 of FIG. 1A, or the remote radio interface as illustrated in FIG. 2, in exactly the same manner as the UCI 12 illustrated in FIG. 1B.

Both UCI's 12 and 26, illustrated respectively in FIG. 1B and FIG. 5, incorporate a radio receiver, (which could equally be an infra-red receiver). The function of this receiver is described below with reference to FIG. 6 where, for illustrative purposes only, the UCI 12 of FIG. 1B is shown connected to a headset, illustrated generally as at 30 having headphones 31 and a microphone 32 located on a stalk which when worn by an operative is in front of the operatives mouth.

In the embodiment illustrated in FIG. 6 the UCI 12 is mounted on the remote radio interface 19 previously described with reference to FIG. 2. The radio system additionally comprises a cordless remote press to talk (PTT) module 33 having a PTT switch 34 thereon and a magnet 35, located adjacent the wall of the casing 36 of the remote module 33. The remote module 33 comprises a low power transmitter arranged such that operation of the PTT switch 34 causes a signal 37 to be transmitted to the UCI 12 which when received by the receiver (not shown) of the UCI 12 the UCI functions as though the PTT switch (16) had been depressed.

The function of the remote module is described below in more detail with reference to FIGS. 7A and 7B, however it should be noted that although only one PTT switch 34 is illustrated on the remote module 33, in order to simplify the description, the module 33 could comprise two switches corresponding to the switches 16 and 17 of the UCI if the module is desired to be used with a UCI designed to operate with two networks.

Referring to FIG. 7A the remote module 33 is shown schematically to comprise a battery 37 connected by PTT switch 34 to transmit circuit 38. When the switch 34 is depressed the battery is connected to the transmit circuit which retrieves a code from EPROM 39. This code is effectively unique to the remote module and is transmitted in a signal via antenna 40 to receiving antenna 41 housed within the UCI 12 illustrated schematically in FIG. 7B, with the function of only one PTT switch 16 illustrated for clarity.

Referring to FIG. 7B the PIT switch 16 connects the microphone 32 to the personal role radio 1. (The communication path to the headphones 31 has been omitted for clarity). Although the headset is shown connected via UCI 12 to personal role radio 1 the radio could be any radio. The microphone 32 may be connected to the personal role radio 1 by means of switch 16 or by means of signal received by receiver 42 via antenna 41. The receiver 42 when receiving the correctly coded signal closes switch 43. It should be noted here that although FIG. 7, and description thereof, talks about opening and closing switches and the switches are illustrated as being physical switches contained within the UCI 12, in practice this function may be achieved electronically and indeed may be achieved by generating an appropriate signal to the transmitter contained within the radio 1.

In order that the receiver 42 may learn the code which the remote module 33 will transmit, the remote module 33 may be held adjacent the UCI 12 with magnet 35 adjacent a magnetically sensitive reed switch 44 in the receiver. With the magnet 35 adjacent the reed switch 44, the reed switch closes setting the receivers circuit to a 'learn' mode. An operative depressing the PTT switch 34 of the remote module 33 causes the code stored therein to be transmitted from the remote module 33 to the receiver 42, which code is then stored in memory in the receive circuit 42 and subsequently recognised as an appropriate code.

The receiver 42 may learn a number of codes such that it is responsive to signals from a corresponding number of remote units. To reset the receiver and wipe out all stored codes the magnet is held adjacent the reed switch and the PTT switch 34 of the remote module 33 pressed five times in quick succession. The receiver circuit 42 is programmed to recognise this as a 'clear all codes' signal. Alternatively the receiver could be programmed to recognise a signal lasting longer than a set duration.

It will be realised that apparatus in accordance with the invention may have any number of applications and the particular applications are outside the scope of the present specification. However for illustrative purposes a brief reference to one application of the invention is given below with reference to a rider of a Police motorcycle.

The Police rider would typically have a personal role radio mounted upon his person complete with a headset and UCI, the UCI either being mounted directly to the radio or perhaps strapped to his chest. The advantage of this is that whether on the bike or dismounted the Police rider carries his complete radio system with him. However whilst riding the bike it is not desirable to let go of the controls and therefore the remote module 33 may be mounted at a convenient location on the handlebars of the bike. Thus when the rider wishes to reply to a communication he can simply push the button 34 and speak into the microphone. On leaving the bike he leaves the remote module 33 on the bike but can communicate by pressing PTT button 16 on the UCI 12.

The rider may ride a number of bikes and a particular bike may be ridden by a number of riders. Here the rider can program the receiver of his UCI with the code of all the bikes or vehicles he rides (cars he drives) so that a remote module mounted on any one of those vehicles will operate his particular radio. When he gets on to a bike he has not ridden before, he simply places his UCI 12 adjacent the remote module 33 of that bike such that the code of that remote module is then stored in the receiver of his UCI.

It would be possible for the remote module 33 to have a receiver and receive codes transmitted from the UCI, however this requires an extra receiver in the remote module 33 and transmitter in the UCI 12. Also it will be realised that a learning mode may be generated other than by magnet 35 for example a screwdriver could be placed in a small hole to operate a switch equivalent to the magnet 35 operating reed switch 43.

The above describes one way in which the present invention may be employed. However numerous other implementations and applications will occur to those skilled in the art which are within the scope of the appended claims.

What is claimed is:

1. A radio system for use by a person having a need to operate different items of equipment, the system comprising:
   a radio adapted to be carried by the aforesaid person;
   cordless PTT switch modules attached to respective items of equipment and each having a transmitter which is short range relative to the radio and is designed to transmit a coded signal when operated;
   learning means associated with the radio for learning a code of the said coded signal from a PTT switch module attached to any item of equipment currently in use by the said person and thereafter to respond to the coded signal by causing the radio to enter a transmit mode.

2. A radio system as set forth in claim 1 characterized in that the learning means includes a learning initiation switch associated with the radio for initiating that process.

3. A radio system as set forth in claim 2 characterized in that the learning initiation switch is a proximity switch whereby the learning process can only be established when the radio is close to the cordless PTT switch module.

4. A radio system as set forth in claim 3 characterized in that the proximity switch is magnetically operated.

5. A radio system as set forth in claim 1 characterized in that the short range transmitter is a radio transmitter.

6. A radio system as set forth in claim 1 characterized in that the short range transmitter is an infra-red transmitter.

7. A radio system as set forth in claim 1 characterized in that the cordless PTT switch module comprises two PTT switches associated with different radio networks.

8. A radio system as set forth in claim 1 characterized in that depressing a PTT switch on the cordless PTT switch module a number of times or for a period in excess of a predetermined period causes learned codes to be removed from the receiver so that the receiver is no longer responsive to those codes.

9. A radio system as set forth in claim 1 characterized in that said learning means associated with the radio which recognizes the code is located in the radio.

10. A radio system as set forth in claim 1 characterized in that the learning means associated with the radio for recognizing the code is located separate from, but is wired to, the radio.

11. A radio system as set forth in claim 1 characterized in that the radio is a personal role radio.

12. A radio system as set forth in claim 1 characterized in that the radio has an additional PTT switch in electrical contact with the radio, the additional PTT switch being arranged to function in parallel with the PTT switch of the cordless module.

13. A radio system as set forth in claim 12 characterized un that the additional PTT switch is located in a unit separable from the radio and wherein the receiver for signals from the remote module is in that separable unit.

14. A radio system as set forth in claim 13 characterized in that the separable unit comprises an interface by which it can be mounted to a plurality of co-operating interfaces.

15. A cordless module for a radio system as set forth in claim 1.

16. A radio for use in a radio system as set forth in claim 1.

17. A radio system comprising:

a radio having a transmit mode;

a cordless remote module in which a press to talk (PTT) switch is housed, the PTT switch being operable for setting the radio to the transmit mode, the remote module including a short range, relative to the radio, transmitter; and a receiver associated with the radio for receiving a signal from the remote module to set the radio to the transmit mode;

learning means associated with the radio for learning the signal from the PTT switch module; and a magnetic switch ranged to enable the learning means when the radio and the remote module are sufficiently close.

* * * * *